United States Patent [19]

Jenkins et al.

[11] 4,044,224

[45] Aug. 23, 1977

[54] PROTECTIVE CIRCUIT FOR DISHWASHER HEATING ELEMENT

[75] Inventors: Thomas E. Jenkins; LeRoy J. Herbst, both of Louisville, Ky.

[73] Assignee: General Electric Company, Louisville, Ky.

[21] Appl. No.: 662,550

[22] Filed: Mar. 1, 1976

[51] Int. Cl.² .................... H05B 1/02; F24H 1/22
[52] U.S. Cl. ........................... 219/322; 219/517; 337/5; 361/42
[58] Field of Search ............... 219/213, 322, 327, 334, 219/363, 423, 481, 514, 517, 519; 337/4, 5, 32, 33, 34, 143, 154, 221; 361/42, 104; 134/57 R, 57 D

[56] References Cited

U.S. PATENT DOCUMENTS

| | | | |
|---|---|---|---|
| 2,171,866 | 9/1939 | Rowe | 200/124 |
| 2,173,708 | 9/1939 | Bulpitt | 219/331 |
| 2,175,495 | 10/1939 | Triplett | 200/120 |
| 2,211,520 | 8/1940 | Smith | 219/481 |
| 2,213,723 | 9/1940 | Smith | 219/481 |
| 2,286,340 | 6/1942 | Bulpitt | 219/441 |
| 2,614,200 | 10/1952 | McNair | 219/322 |
| 2,786,123 | 3/1957 | Tayler | 219/517 |
| 3,364,335 | 1/1968 | Palatini et al. | 219/213 |
| 3,386,004 | 5/1968 | Dwyer | 361/104 X |
| 3,444,355 | 5/1969 | Tayler | 219/331 |
| 3,621,431 | 11/1971 | Hitchcock, Sr. | 337/5 |
| 3,636,309 | 1/1972 | Deaton | 219/464 X |
| 3,766,435 | 10/1973 | Childers | 361/42 |
| 3,780,250 | 12/1973 | Ando | 361/42 X |
| 3,829,807 | 8/1974 | Krueger | 337/143 X |
| 3,864,581 | 2/1975 | Satyanarayana | 361/42 X |

*Primary Examiner*—C. L. Albritton
*Attorney, Agent, or Firm*—Francis H. Boos

[57] ABSTRACT

A protective circuit for a heating element in a polymeric resinous tub dishwasher including an electric-type resistance heating element and a heat-sensible, dual-functioning switch. The switch is connected in the ground circuit so that current passing to ground will cause a fusible link to melt and thereby open the ground circuit. At the same time, melting of the link allows a switch in the power circuit to open, thereby eliminating any power to the heating element.

4 Claims, 3 Drawing Figures

PROTECTIVE CIRCUIT FOR DISHWASHER HEATING ELEMENT

BACKGROUND OF THE INVENTION

It is common to provide automatic dishwashers with electric resistance-type heating elements to supply heat to the wash chamber. Such heating elements are described in U.S. Pat. No. 3,592,771, issued July 13, 1971, and reference is made thereto for a more complete description of such heating elements. Generally, these heating elements include an electric resistance-type wire which is encased in a ceramic-filled, metallic sheath. The ceramic material transmits heat, but is an electrical insulator and, thus, the sheath becomes hot but does not become electrically charged.

However, one industry-wide problem with such heating units is that from time to time, for reasons not fully understood, the ceramic material, which is comprised in large portion of magnesium oxide, breaks down and becomes an electric conductor. When this breakdown occurs, electricity may arc from the electric resistance element to the outer sheath, which is generally grounded in accordance with various building code requirements. This arcing is accompanied by a disruption in the outer metallic sheath which travels along the length of the sheath as the ceramic material breaks down. This phenomena is commonly referred to as "zippering." Prevention of this zippering phenomena is a problem which remains heretofore unsolved. At best, it can only be arrested. U.S. Pat. No. 3,636,309 is related since it addresses itself to a similar problem by providing a conductive strip located around the periphery of a cover plate of a range surface heating unit. The conductive strip is connected in a circuit having an electronic switch arrangement for sequentially open-circuiting the power lines to the cooking assembly, should breakage of the cover plate occur. In the same vein, U.S. Pat. No. 2,173,708 relates to electric immersion heaters having a fusible link which melts at a predetermined temperature, so that the circuit to the heater is broken. Neither of the above prior art teachings provides a method for terminating the zippering phenomena when it occurs, which, at the same time, insures that there will not be a "live" wire inside the major appliance upon termination.

SUMMARY OF THE INVENTION

The present invention is a simple, straightforward, circuit arrangement, which, when connected in a dishwasher circuit with a heating unit, will terminate zippering when it occurs. The switch also opens the power circuit to the heating element, so that there are no "live" wires inside the dishwasher after termination.

The termination of zippering is accomplished by providing, in the dishwasher circuitry, a switch arrangement which includes a fusible link in the ground line from the outer sheath of the heating unit to ground. Melting of this fusible link also releases a normally-open switch from its closed position, thereby opening the power circuit to the heating unit and thus eliminating any possibility of a "live" wire inside the appliance.

More specifically, the invention includes a protective circuit for a heating element in an automatic dishwasher which includes an electrical resistance-type heating element connected in an electric power circuit and encased in a ceramic-filled metallic sheath; conductive first and second supports confining a switch means and electrically connected by a fusible link, said first support being electrically attached to said sheath, and, said fusible link being a current-carrying link in a grounding circuit from said sheath to ground; further, said switch means being a normally-open switch in the electric power circuit of the resistance-type heating element, the protective circuit being further defined in that said fusible link maintains said normally-open switch in the closed position until current caused by an electric arc passing from said heating element to said sheath through said link to ground, melts said link and allows said switch to move to its normally-open position, thereby simultaneously opening the ground circuit to terminate the passage of said electric arc and cutting off the power to said heating element.

The invention of this application has been found to be an effective, efficient method of terminating the arcing of electricity from a resistance-type heating element to an outer sheath through a ceramic material and, at the same time, opening the power circuit to the heating element to avoid having a "live" line inside the appliance.

DESCRIPTION OF THE PREFERRED EMBODIMENT

Figure 1:
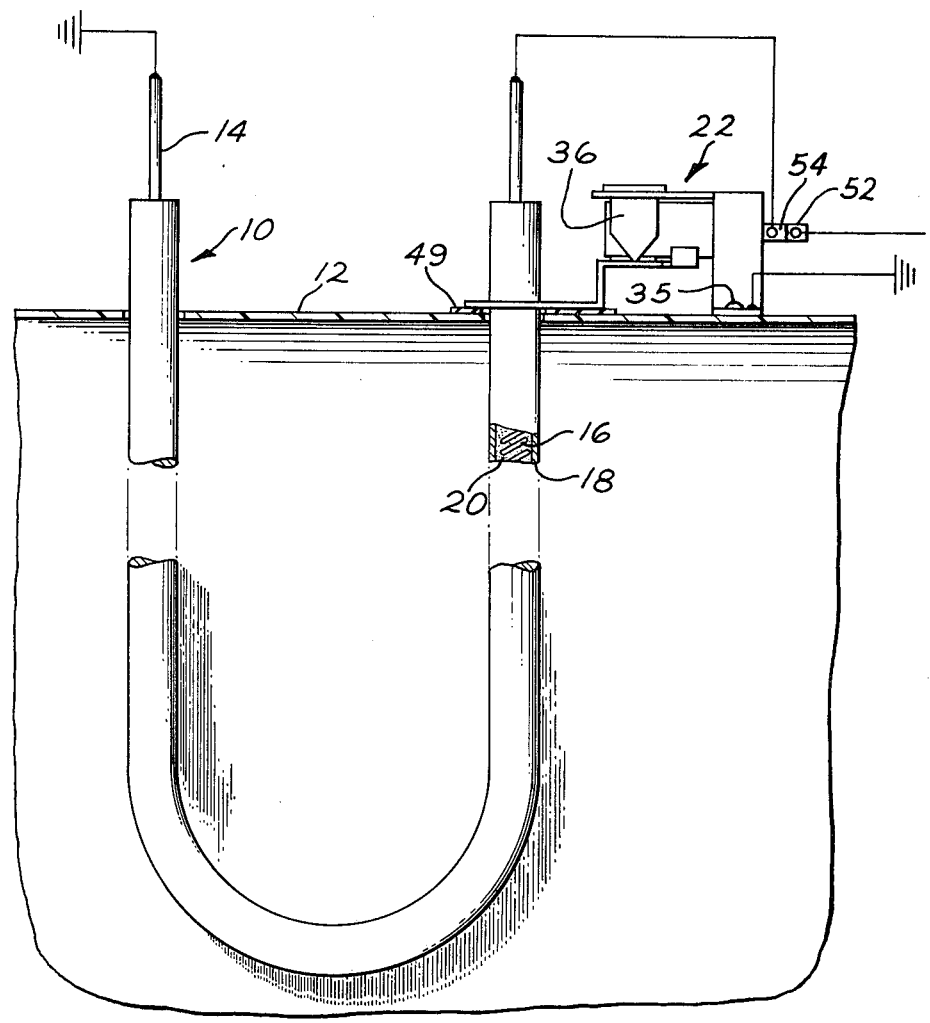
FIG. 1 shows an electric resistance-type heater mounted through the wall of an appliance and a heat-sensible switch electrically connected therewith.
Figure 2:
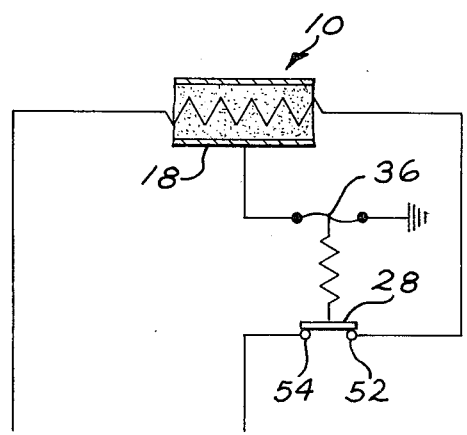
FIG. 2 shows a diagrammatic circuit including the heating element and the heat-sensible switch.
Figure 3:
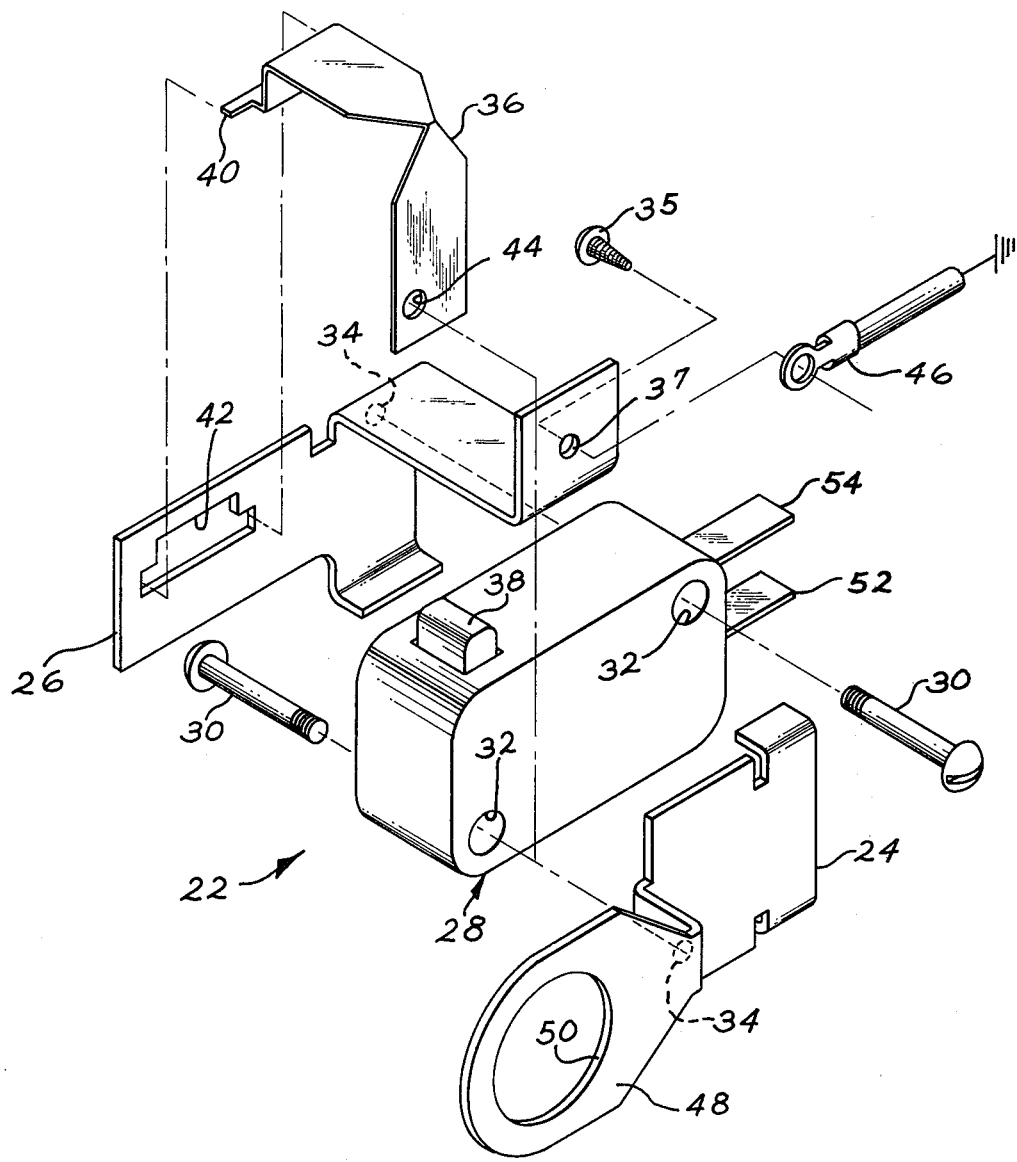
FIG. 3 shows an exploded view of the heat-sensible switch assembly of this invention.

Referring to FIG. 1, an electric resistance-type heating unit 10 is shown projecting through a dishwasher polymeric resinous wall 12. The heating unit 10 includes low-resistance terminals 14 which are electrically connected to opposite ends of a high resistance electrical element 16 encased in a metallic sheath 18, which, in turn, is filled with a ceramic material 20. The low resistance terminals project into the sheath a distance sufficient to prevent its ends from getting hot during operation of the heating unit. Such heating units are more fully described in U.S. Pat. No. 3,592,771, issued July 13, 1971. Mounted on the outside wall of the appliance is a heat-sensible switch assembly 22. The assembly is electrically connected to both the power circuit that delivers power to the terminal 14 and to the ground circuit which grounds sheath 18 to ground (see FIG. 2). The assembly is insulated from the wall by insulator 49.

Switch assembly 22 includes first and second supports 24 and 26, which encompass a normally-open switch 28. Screws 30 pass through holes 32 in the case of switch 28 and are threaded into corresponding apertures 34 in the respective first and second supports, thus attaching the supports and switch in a compact assembly. Fusible link 36 is electrically connected between supports 24 and 26, respectively, and bridges over the top of switch 28, thereby depressing button 38 to hold normally-open switch 28 in closed position. Fusible link 36 includes a bifurcated end 40 which fits into slot 42. On its opposite end, fusible link 36 includes hole 44 which is engaged by screw 30 to insure that it is securely fastened in position. Support 26 also has attached thereto terminal 46, in electrical contact therewith, which leads to ground.

In the drawing, screw 35 passes through hole 37 to hold terminal 46 in contact with support 26 and, at the same time, fastens the entire switch assembly to the dishwasher wall 12.

Lastly, tab 48 is provided as an integral part of first support 24. Tab 48 includes an orifice 50 which is preselectively sized to fit in abutting electrical contact with sheath 18 passing therethrough.

Thus, it can be seen that there is an electrical path from sheath 18 through tab 48 and through first support 24 through fusible link 36 and through second support 26 and, finally, through terminal 46 to ground. This path will be readily interrupted by a high current flow passing through fusible link 46.

In addition, switch 28 includes terminals 52 and 54 which are connected in series with the power line to heating unit 10. Thus, as long as fusible link 36 remains intact, button 38 is held down and the circuit is complete so that power may flow to heating unit 10.

The heating unit assembly has, in operation, been found to be effective for use in plastic-tub dishwashers where there is a current flow of between one and three amps for at least one second. Under such circumstances, fusible link 36 will melt and the circuit to ground will open, thereby stopping any current flow and, at the same time, button 38 will move upwardly, thereby opening switch 38 and cutting off power to heating unit 10.

Admittedly, the heating unit assembly has proved to be ineffectual for detecting lesser amounts of current occurring for lesser time periods and, in addition, can only be used where codes or Underwriters Laboratory specifications permit the opening of a ground circuit in a major appliance.

Having thus described the invention, what is claimed is:

1. A protective circuit for a heating element in an automatic dishwasher which includes:
   an electrical resistance-type heating element connected in an electric power circuit and encased in a ceramic-filled metallic sheath;
   conductive first and second supports confining a switch means and electrically connected by a fusible link, said first support being electrically attached to said sheath and said fusible link being a current-carrying link in a grounding circuit from said sheath to ground; further, said switch means being a normally-open switch in the electric power circuit of the resistance-type heating element, the protective circuit being further defined in that said fusible link maintains said normally-open switch in the closed position until current caused by an electric arc passing from said heating element to said sheath through said link to ground, melts said link and allows said switch to move to its normally-open position, thereby simultaneously opening the ground circuit to terminate the passage of said electric arc and cutting off the power to said heating element.

2. The apparatus of claim 1 wherein said first and second supports encompass said switch means and provide for said switch means to be mounted to said dishwasher.

3. The apparatus of claim 1 wherein one of said supports includes an aperture preselectively sized to electrically engage the metallic sheath.

4. The apparatus of claim 1 wherein said fusible link includes a bifurcated end which allows easy replacement of said link.

* * * * *